(12) United States Patent
Huang et al.

(10) Patent No.: US 8,591,975 B2
(45) Date of Patent: Nov. 26, 2013

(54) FILLED REFRIGERATED DOUGH

(75) Inventors: Victor Huang, Brooklyn Center, MN (US); Jalayne Martin, Roseville, MN (US); Jeffrey Enz, Minneapolis, MN (US); Jean Louis Weber, Plymouth, NH (US); Lisa Kopas-Lane, Excelsior, MN (US)

(73) Assignee: General Mills, Inc., Minneapolis, MN (US)

( * ) Notice: Subject to any disclaimer, the term of this patent is extended or adjusted under 35 U.S.C. 154(b) by 1757 days.

(21) Appl. No.: 10/369,213

(22) Filed: Feb. 19, 2003

(65) Prior Publication Data

US 2004/0161502 A1    Aug. 19, 2004

(51) Int. Cl.
*A21D 10/02*    (2006.01)

(52) U.S. Cl.
USPC ............. 426/94; 426/128; 426/131; 426/496; 426/573; 426/578; 426/572

(58) Field of Classification Search
USPC ............ 426/94, 128, 131, 496, 573, 578, 572
See application file for complete search history.

(56) References Cited

U.S. PATENT DOCUMENTS

| | | | |
|---|---|---|---|
| 3,185,576 A | 5/1965 | Ross ................................ 99/129 |
| 3,352,688 A | 11/1967 | Messina .......................... 99/131 |
| 3,356,506 A | 12/1967 | Matz et al. ........................ 99/90 |
| 3,397,064 A | 8/1968 | Matz et al. ........................ 99/90 |
| 3,532,510 A | 10/1970 | Zimmerman |
| 3,669,682 A | 6/1972 | Lutz ................................. 99/90 |
| 3,981,433 A | 9/1976 | Thornhill et al. ............... 229/51 |
| 4,199,604 A | 4/1980 | Kahn et al. |
| 4,381,315 A | 4/1983 | Yong et al. ...................... 426/94 |
| 4,388,336 A | 6/1983 | Yong et al. .................... 426/551 |
| 4,415,598 A | 11/1983 | Chen et al. .................... 426/394 |
| 4,526,801 A | 7/1985 | Atwell .......................... 426/128 |
| 4,670,272 A | 6/1987 | Chen et al. ...................... 426/94 |
| 4,721,622 A | 1/1988 | Kingham et al. ............... 426/94 |
| 5,059,433 A | 10/1991 | Lee et al. ......................... 426/94 |
| 5,084,284 A | 1/1992 | McDilda et al. ............... 426/128 |
| 5,368,877 A | 11/1994 | Huang et al. ................... 426/589 |
| 5,503,863 A * | 4/1996 | Brain et al. .................... 426/573 |
| 5,759,596 A | 6/1998 | Domingues et al. .............. 426/8 |
| 5,792,499 A | 8/1998 | Atwell ........................... 426/549 |
| 6,042,852 A | 3/2000 | Atwell et al. ................... 426/27 |
| 6,113,976 A | 9/2000 | Chiou et al. |
| 6,146,672 A | 11/2000 | Gonzalez et al. ................ 426/94 |
| 6,210,723 B1 | 4/2001 | Coleman et al. ................ 426/94 |
| 6,280,782 B1 | 8/2001 | Hahn et al. ...................... 426/94 |
| 6,322,829 B1 * | 11/2001 | McGlynn et al. ............... 426/89 |
| 6,827,958 B2 * | 12/2004 | Brown et al. ................... 426/94 |
| 2002/0039612 A1 | 4/2002 | Gambino et al. |
| 2002/0068115 A1 | 6/2002 | Hayes-Jacobson |
| 2002/0142070 A1 | 10/2002 | Bedi et al. |

FOREIGN PATENT DOCUMENTS

| | | |
|---|---|---|
| EP | 1 080 646 A1 | 3/2001 |
| EP | 1 157 613 A1 | 11/2001 |
| EP | 1 287 743 A2 | 3/2003 |

OTHER PUBLICATIONS

"Conversation Factors and Technical Data for the Food Industry," by Harrel and Thelen, Sixth Edition (1959), Burgess Publishing Company, pp. 340-341.

* cited by examiner

*Primary Examiner* — Lien T Tran

(74) *Attorney, Agent, or Firm* — Mara E. DeBoe; John L. Crimmins

(57) ABSTRACT

The present invention provides a refrigerated, unbaked dough product comprising a leavened dough and a high moisture filling at least partially enrobed in the leavened dough. The filling comprises water a gelling agent or thickening agent. The filling has a water moisture to fat content ratio (if fat is present) greater than or equal to 1.8. The filling exhibits particular rheological properties at certain temperatures, wherein the filling has an uncooked 20° C. G' value of at least about 4,000 pascals, and a 80° C. G' of at least about 1000 Pa. The water activity of the filling is at least about 0.85. The dough product is disposed within a container at a pressure greater than one atmosphere. The thus provided product exhibits excellent storage and baking characteristics, with highly desired organoleptic properties.

26 Claims, No Drawings

FILLED REFRIGERATED DOUGH

FIELD OF THE INVENTION

The present invention relates to refrigerated dough. More specifically, the present invention relates to leavened refrigerated dough that is provided with a filling.

BACKGROUND OF THE INVENTION

Non-emulsion based, moisture containing fillings for dough products and dough products incorporating the filling are disclosed in U.S. Pat. No. 6,280,782. The fillings as described therein comprise at least two water activity-impacting ingredients, so that the water activity of the fillings can be adjusted to be substantially equivalent to the water activity of the dough with which the filling is to be utilized to form a dough product. The filling preferably comprises from about 20 percent to about 60 percent fat. Various viscosity controlling agents are listed at column 7, lines 42-53, including methylcellulose and hydroxypropyl cellulose, together with various gums and the preferred hydrocolloid gum, alginate. Liquids to be included in the filling composition of this patent, including water, are stated to be desirably included in amounts ranging from about 1 percent to 35 percent, more preferably from about 5 percent to about 25 percent. See column 11, lines 23-25. The examples all contain much more shortening than water in the filling formulation with a moisture to fat content ratio of $\leq 1.75$ (($mc/fc)_{max}$=35%/20%=1.75), and have a water activity of 0.837 or below. All of the examples also had significant filling flow, labeled as pan pooling.

A dough enrobed cheese filling is disclosed in U.S. Pat. No. 6,210,723. Example 1 discloses a cheese filling made from ingredients including cheese shreds, hydroxypropyl methylcellulose, and pregelatinized tapioca starch, wherein the cheese filling has a moisture content of 37 percent. This product is proofed, baked and cooled prior to packaging. See column 1, lines 64-67. This product is not designed for refrigerated storage as unbaked dough.

SUMMARY OF THE INVENTION

A refrigerated, unbaked dough product is provided comprising a leavened dough and a high moisture filling at least partially enrobed in the leavened dough. The high moisture filling comprises water, fat as an optional ingredient, and a gelling or thickening agent, and has more water than fat by weight if fat is present. The filling has a moisture content to fat content greater than 1.75 (($mc/fc)_{min}$>1.75). The water activity of the filling is at least about 0.85. The filling has an uncooked 20° C. yield stress (G') of at least about 4,000 pascals, and a 80° C. yield stress (G') of at least about 1,000 pascals. The dough product is stored at a temperature from about 0° C. to about 10° C., and is disposed within a container at a pressure greater than one atmosphere.

DETAILED DESCRIPTION OF THE INVENTION

Many refrigerated dough products contain fillings within the dough, e.g., cinnamon or fruit fillings, which are desirably moist in appearance and taste. However, including an amount of moisture, i.e., in the form of water, fruit juice, or other consumable liquid, necessary to impart these desirable characteristics to the filling presents many difficulties to the manufacturer of such products. That is, fillings with a high moisture content typically will have a low viscosity and will tend to be very fluid, rendering them difficult to apply to dough products in a manufacturing setting. Furthermore, once so applied, the filling can impart a slipperiness to the dough product, and thus, can make it difficult to form the dough into shapes around the filling. Finally, once packaged, these dough products are typically stored for relatively long periods of time, i.e., during transport from the manufacturer to the retail environment, retail shelf time, and in storage at the end user facility. Such long periods of storage are generally not well tolerated by dough products including a high moisture filling, because the moisture has a tendency to migrate between the filling and the dough and/or into the packaging. Moisture migration between the filling and the dough can adversely affect the quality of the filling, as well as the dough, and thus, the overall dough product quality can suffer.

In the case of refrigerated dough products that are stored in pressurized containers, migration of components from the dough to the filling or vice versa during storage of these products may lead to a disturbing alteration of the product configuration upon opening of product. More specifically, if water flows from, for example, the dough to the filling, the viscosity of the filling may be altered, resulting in a less viscous filling than desired. The filling may flow away from the dough during handling or baking, or may appear to be watery. Similarly, hydrogen ions may migrate from the filling to the dough, thereby altering the pH of the filling in the dough product, resulting in a product that does not meet flavor expectations. Finally, carbon dioxide in the system may be transferred to the filling from the dough. When a product that is stored in a pressurized container is removed from the container, the sudden release of pressure on the product will cause the carbon dioxide to come out of solution and evolve as a gas. The resulting gas release will result in bubbling, fizzing or even a somewhat explosive spattering of the filling to occur.

The issues discussed above present problems not only to the manufacturer of such products, but also to the end-user in the preparation and consumption of the baked dough products. One or more of the problems as discussed above, if manifested, can result in suboptimal baked dough products.

Surprisingly, it has been discovered that a high moisture filling-containing, refrigerated dough product suitable for baking may be prepared that is storable in a pressurized container in a stable manner. By careful selection of the components of the filling, including gelling agents that provide specific rheological properties at certain predetermined temperatures, a filling-containing refrigerated dough product in a pressurized container is provided with the desired organoleptic properties as a relatively low fat product. The phrase "organoleptic properties" as used herein is meant to indicate those properties, whether visual, textural or taste properties that contribute to the overall quality of a dough product. For example, organoleptic properties are typically meant to include such properties as taste, color, smell, texture, shape, appearance, mouthfeel, smoothness, and the like. The phrase "rheological properties" as used herein is meant to indicate the physical response of the material to manipulation. For example, rheological properties include dynamic viscosity ($\eta$), viscous modulus (G"), and elastic modulus (G').

There are four significant time periods for measurement of the rheological properties of the filling in the life of a filled dough product of the present invention. The first rheological measurement time is at the time of preparation or assembly of the filled dough product. The second is the rheological measurement of the filling at the time of storage of the refrigerated, pressurized filled dough product. The third is the rheology of the filling at the time of baking, and the fourth is the rheology of the filling at the time of consumption. It has surprisingly been found that the rheological values of the fillings at the second and third times in the above cycle are critical for preparing a filled dough product capable of achieving product performance expectations, wherein the filled dough product may be stored in refrigeration under pressure, and heated without exhibiting filling instability.

Specifically, it has been surprisingly found that by incorporating gelling agents in the amounts effective to obtain the desired rheology, it is possible to control the rheology of the filling in the dough product at predetermined temperatures such that the filled dough product is both storage stable and stable throughout the cooking process to provide a desired filled dough product. Thus, by selection of appropriate gelling agents, one can provide a filling that has an uncooked 20° C. yield value (G') of at least about 4,000, more preferably at least about 5,000 and most preferably at least about 7,000 pascals. Preferred fillings have uncooked 20° C. G' value ranges of from about 4,000 to about 50,000 Pa, and more preferably from about 5,000 to about 30,000 Pa. Filling compositions having an uncooked 20° C. G' of at least about 4,000 have been found to be stable during the second time period described above, the time of product storage as a refrigerated, pressurized filled dough product. It has surprisingly been found that such fillings exhibit minimal movement within the product configuration during refrigerated product storage. Further, upon opening the refrigerated dough product container, the filling is stable even during the pressure change experienced by the product. Minimal or no movement of the filling with respect to the desired product configuration is observed during the critical pressure change. Most importantly, little or no fizzing or other undesired dimensional instability of the filling is observed during the pressure change of the product.

Additionally, by selection of appropriate gelling agents, one can provide a filling that has an 80° C. G' of at least about 1000 Pa, preferably from about 1,000 to about 20,000, and more preferably from about 1,500 to about 10,000 Pa. Filling compositions having an 80° C. G' of at least about 1,000 have been found to be stable during the third time period described above, the time of cooking of the filled dough product. The thus formulated filling exhibits a high degree of flow control during the baking process. The relatively high viscosity of the filling at this temperature tends to prevent undesirable flow when the dough product is heated, thereby avoiding messy filling spills while the product is being baked.

The rheology of the filling at the first time period described above, the time of assembly of the filled dough product, is selected so that it is appropriate for the particular method of assembly of the filled dough product. For example, in methods of assembly wherein the filling is to be injected or otherwise transferred in a liquid form to the dough component of the filled dough product, the rheology of the filling is preferably pumpable by standard filling equipment. The filling is optionally selected to have a low or medium viscosity for ease of assembly of the filled dough product. In this embodiment, the ingredients are selected such that the viscosity builds over time, for example, by using viscosity enhancing agents that slowly increase viscosity or that are encapsulated or otherwise protected to delay onset of the viscosity enhancing function. Alternatively, the filling may be formulated so that the viscosity of the filling increases as the temperature of the product decreases during refrigerated storage. If the method of assembly of the filled dough product requires that the filling be transferred in a solid or semi solid form, the viscosity of the filling preferably is high or very high to facilitate this assembly technique.

The rheology of the filling at the fourth time period described above, the time of consumption of the filled dough product, may be optionally selected to provide the optimal rheological characteristics of the particular filled dough product to be consumed. Thus, when the filled dough product is of the type wherein the filling is desirably gooey or runny, the viscosity of the filling is appropriately selected to be relatively low. Fillings exhibiting a viscosity as described above provide a highly desired lower viscosity flow at the time of consumption, which is very pleasing to the consumer.

The cooked viscosity corresponds to the preferred target temperature of the product when the product is ready to be eaten, after the product has been exposed to high temperature corresponding to a baking temperature. Products may be eaten at any desired temperature suitable for the particular product and preference of the consumer. Thus, the temperature at which the evaluation of the cooked viscosity of the filling is performed is determined by a theoretical target temperature for consumption of the given product. Evaluations are preferably performed on products that have been exposed to heating profiles corresponding to real world expectations of heating and cooling rate profiles. Generally, it is expected that products of the present invention will be consumed at room temperature, which is approximated by test evaluation at about 25° C., or at an elevated temperature, which is approximated by test evaluation at about 50° C. Products at either of these temperatures may have target viscosities corresponding to the expectations or desires of the consumer. One expectation of consumers is to obtain products that have a relatively free flowing or runny filling. Such fillings would exhibit a cooked filling G' of less than about 1,000 Pa. Alternative fillings are desired by consumers that are more viscous and less free flowing in nature. Such fillings would exhibit a cooked filling G' of greater than about 1,000 Pa. Preferably, such thicker fillings would have a cooked filling G' of about 1,000-50,000 Pa. The option of runny or thicker fillings is of course available for products intended to be consumed at either room temperature or at an elevated temperature.

Gelling agents to provide fillings having the above indicated viscosity profiles may be selected by skilled artisans, utilizing the principles as described herein, to prepare new filled dough products of the present invention. Preferably, the gelling agent is present in the filling composition at an amount of about 0.1 to about 10% by weight. The desired viscosity of the filling at any given temperature may be achieved through the use of one or more gelling agents, or one or more gelling agents in combination with one or more thickening agents.

In one embodiment of the present invention, the gelling agent is a heat stable gelling agent, thereby providing a relatively constant desired viscosity throughout the temperature profile experienced by the dough product. Preferred heat stable gelling agents include xanthan gum, alginate, agar, heat stable pregelatinized starch, and heat stable locust bean gum. Filling compositions containing heat stable gelling agents may exhibit a uniform yield stress (G') throughout the temperature profile as experienced by the filled dough product of the present invention. Heat stable gelling agents therefore may efficiently provide a filling composition that achieves a relatively stable yield stress through the product assembly stage, the storage stage, the baking stage, and the product consumption stage.

In another embodiment of the present invention, the gelling agent comprises a thermal reversible heat activated gelling agent, thereby providing a filling that increases in strength upon heating. For purposes of the present invention, a thermal reversible heat-activated gelling agent is a material when added to a filling composition causes the filling to exhibit a first low G' at a temperature of about 20° C., a second G' that is higher than the first low G' when the composition is heated above a temperature of about 80° C., depending on the type and number of hydroxypropyl and methyl substitutions, and a third G' that is similar to the first once the composition cools to a temperature of about 25° C. The viscosity modifying properties of these gelling agents are of course evaluated in formulations that are free of other viscosity modifying agents, so that the viscosity modifying effect of the gelling agent is not masked by the presence of other viscosity modifying agents in the test composition.

Preferably, the thermal reversible heat-activated gelling agent is selected from methylcellulose, and hydroxypropyl methylcellulose. Such thermal reversible heat-activated gelling agents are commercially available, for example, as METHOCEL® cellulose ether products from The Dow Chemical Company. Filling compositions containing thermal reversible heat-activated gelling agents may exhibit a relatively high viscosity at high temperature stages of the temperature profile as experienced by the filled dough product of the present invention. Thermal reversible heat-activated gelling agents therefore may efficiently provide a filling composition that achieves the G' profile of having a relatively low G' at the product assembly stage and the storage stage, a relatively high G' at the baking stage, and a relatively low G' after cooling. The viscosity is determined by the particular heat-activation temperature of the gelling agent and the selected consumption temperature of the product.

The use of mixtures of gelling agents is specifically contemplated. For example, the viscosity of a filling containing only a heat activated gelling agent may not be sufficiently high to provide the desired stability properties at refrigerated storage temperature (e.g. 20° C.). In such a filling, the addition of a second gelling agent to the heat activated gelling agent is desirable to achieve the viscosity requirements at 20° C. The second gelling agent may be a heat stable gelling agent, or may be a thermodegradable gelling agent (as discussed below).

Thermodegradable gelling agents are particularly useful for certain embodiments of the present invention. For purposes of the present invention, a thermodegradable gelling agent is a material that enhances viscosity of a filling composition that has not been exposed to a temperature above about 40° C. as compared to a like formulated filling composition not containing the thermodegradable gelling agent, but which exhibits a lowering of viscosity when the filling composition is heated above a temperature of about 55° C. Preferred thermodegradeable gelling agents include gelatin, guar, gum arabic (acacia), gum tragacanth, carboxymethylcellulose, thermodegradable pregel starches and thermodegradable locust bean gums.

In a preferred embodiment of the present invention, the filling composition comprises a thermodegradable gelling agent in an amount sufficient to provide a filling having an uncooked 20° C. G' of about 5,000 to about 50,000, and more preferably, from about 7,000 to about 25,000 Pa. Additional preferred embodiments of the present invention exhibit an 80° G' value of from about 1,000 to about 20,000 Pa, and more preferably from about 1,500 to about 10,000 Pa.

Another preferred filling comprises a mixture of a heat-stable gelling agent, a thermodegradable gelling agent, and a heat-activated gelling agent to provide the desired viscosity profile over the temperature range of the product.

Another preferred filling comprises a heat-stable gelling agent or a mixture of heat stable gelling agents to provide the desired viscosity profile over the temperature range of the product.

In one embodiment of the present invention, gelling agents are used that are stable to thermal degrading during and after the cooking process. Examples of thermal stable gelling agents include pre-gel starch, Locust bean gum, Gellan gum (in the presence of cations), pectin and alginate (in the presence of Ca+2), and agar.

Gelling agents are preferably selected such that they are not adversely affected by the other components present in the specific filled dough product. For example, gelling agents that are adversely affected by the relatively high acid content of fruit-containing fillings should not be used with a fruit-filled dough product. Likewise, certain components or additives may contain sequestering or chelating agents that would interfere with gel formation. For example, calcium is pivotal to the formation of a gel matrix for alginates, and therefore components that would inhibit the availability of calcium, such as certain chemical leavening acid incorporating polyacid functionalities (e.g. sodium acid pyrophosphate ("SAPP")), should not be used in systems relying on alginate as the gelling agent.

As used herein, the phrase "water activity" or "Aw" with respect to a filling or a dough is meant to indicate the ratio of the vapor pressure of the filling or dough to the vapor pressure of pure water at any given temperature. Thus, pure water has a water activity of 1. Water including any other component, such as sugar or salt, will have a water activity of less than 1. Water activity can be measured by, e.g., enclosing the sample desirably measured in an enclosed space. Once equilibrium is reached, the relative humidity above the sample can be measured, which measurement is indicative of the water activity of the sample. Such measurements can be made, e.g. as by a water activity meter such as that commercially available from Decagon Devices, Inc., Pullman, Wash.

Preferably, the difference between the water activity of the dough and the water activity of the filling is less than about 0.03. By providing closely matched dough and fillings in water activity, the transfer of components between the two aspects of the filled dough compositions is greatly reduced, with enhanced storage and baking stability of the filled dough product. While not being bound by theory, it is believed that the relatively narrow differences of filling and dough water activities are necessary due to lack of moisture protection from the fat.

As noted above, transfer of protons between the filling and the dough may have adverse effects on flavor and other aspects of the product. Preferably, the difference between the pH of the dough and the pH of the filling is less than about 2.0.

The filling as provided in the uncooked filled dough product may be a raw or cooked food product. The filling can have a uniform consistency or a chunky consistency, and can be made from any type or types of food ingredients, including savory or sweet ingredients. Examples of savory ingredients include but are not limited to meat, vegetable, and dairy ingredients (including flavored butter components). Examples of sweet ingredients include but are not limited to fruit, icing, honey, and other such sweet sauce components. Both savory and sweet ingredients may further include spices, herbs, flavoring agents, fats, and the like. The filling may further include such ingredients as preservatives and consistency modifiers such as emulsifiers and thickening agents.

Particularly preferred savory fillings are cheese fillings, tomato paste sauces such as Italian sauces, and meat flavored gravies. A highly preferred baked dough product is a cheese filled breadstick. Particularly preferred sweet fillings are vanilla, fruit (such as strawberry, blueberry, peach and so forth), cinnamon or chocolate flavored icings.

The filling of the present invention comprises water and fat, and contains more water than fat by weight. This particular selection of ingredients in the filling provides a high moisture content that is particularly desired by consumers. Because the filling contains more water than fat by weight, the desired organoleptic properties of the filled dough product may be achieved with use of relatively less fat than those earlier thought to be required. Further, the fillings of the present invention may provide the desired organoleptic properties of a filled dough product at a lower fat and calorie content than comparative products, thereby providing potentially more healthful food products.

Water may be provided in the form of water per se, or may be provided as a component of a consumable liquid, such as juice or milk. The particular consumable liquid will depend upon the desired end-use application. Preferably, water comprises 35-60% by weight of the filling, and more preferably 40 to 50% of the filling.

Fat is provided in the filling of the present invention at a level that is dramatically lower than prior high moisture fillings. Preferably, fat is present as 0.1-20%, and more preferably 5-15% by weight of the filling. The fat may be a liquid or a solid at room temperature. For ease of mixing, if the fat is a solid at room temperature it preferably is heated to form a liquid. Preferred fat compositions are selected from oils and shortenings. Preferred oils include, for example, soybean oil, corn oil, canola oil, olive oil, sunflower oil, peanut oil, and other vegetable or nut oils. Preferred shortenings include, for example, animal fats such as butter and hydrogenated vegetable oils such as margarine. Mixtures of different fats are also contemplated.

Other additives that may optionally be utilized in the fillings of the present invention include, for example: salt; whiteners, such as titanium dioxide; anti-microbial agents, such as potassium sorbate, sorbic acid, dehydroacetic acid, sodium benzoate, and the like; buffers; food acids; preservatives; antioxidants, such as butylated hydroxytoluene, butylated hydroxyanisole, and the like; as well as vitamins and minerals.

Sequestering agents may be used to control the concentration of radical species (e.g., $Cu^{++}$, $Fe^{++}$), which can have a deleterious effect on the color of the filling. A common sequestering agent is an alkali metal pyrophosphate, such as SAPP.

Acidulants, such as citric, acetic, tartaric and phosphoric acids can also provide pH control, and function in other capacities as well. For example, citric acid, in addition to being useful for pH control, can also be used to activate potassium sorbate for mold control, to counter the alkalinity of cocoa used in a chocolate formulation, and to impart a tart flavor to the filling.

Optionally, various ingredients, such as colorants, may be encapsulated to prevent migration of that ingredient from the filling to the dough or vice versa.

The dough of the present invention is a leavened dough comprising at least flour, water, salt, and a leavening system. For purposes of the present invention, leavened dough is a dough that comprises a leavening agent such that dough expansion takes place to provide a baked dough product that will have a desired baked specific volume. The term "baked specific volume" ("BSV") is a term of art generally known in the industry to define the inverse of density or fluffiness of a baked good, and is simply the volume of the baked product divided by its weight. The determination of BSV is of course done only on the dough portion of the baked product, and does not include any filling, if present in an amount sufficient to substantially alter the BSV value of the product. The dough of the present invention, when baked, preferably has a BSV of about 2.5 to about 6 cc/g, and more preferably of about 3 to about 5 cc/g. The evaluation of the properties of the baked dough product of the present invention is made after individual sized dough portions are baked in an appropriate manner, time and temperature as is readily apparent to the routineer in this art. Thus, baking takes place at a temperature appropriate for the specific food product, typically 350° F. in a conventional oven or a convection oven, for a time sufficient to completely cook the product while not overcooking the product. Alternatively, the filled dough product of the present invention may be cooked by another appropriate process, such as deep frying, microwaving, grilling or the like, as will be appreciated by those of ordinary skill in the art.

Examples of preferred filled dough products of the present invention include doughnuts, danishes, toaster pastries, coffeecakes, sweet rolls, bismarks, cookies, bagels, scones, dinner rolls, breads, sandwiches, croissants, egg twists, bread sticks, and the like. Formulations of such dough products, in addition to being well known to those of ordinary skill in the art, are also described in a voluminous number of available cookbooks and other references.

A particularly preferred embodiment of the present invention comprises dough products that are high-volume biscuits. (High-volume biscuits are distinct from lower volume baked crisp snack products sometimes referred to as biscuits in certain cultures, but known in the United States as crackers.) High-volume biscuits comprise flour, water, chemical leavening system and fat, and are characterized by being an underdeveloped dough. Thus, the biscuit dough is prepared by mixing the dough composition only enough to incorporate all the ingredients without fully developing the gluten in the dough. As is appreciated by those of skill in the baking art, a biscuit dough is distinct from bread-like doughs due to the degree of development of the dough. A tool to quantify the nature of the extent of development of the dough is a farinograph, which is a common flour and dough quality measuring device which measures the resistance of the dough to mixing. As dough is mixed, the resistance to mixing increases until a peak is reached, after which the resistance to mixing decreases. Biscuit doughs typically reach a peak of resistance in a time period greater than about 7 minutes, and preferably greater than about 10 minutes. The biscuit dough is mixed using a mixer suitable for the size batch to be prepared.

The flour to be used may be any suitable flour for manufacture of dough products. Generally, the dough of the invention comprises a processed or unprocessed flour, which may either be a white flour or a whole grain constituent. Wheat flour is preferred, although non-wheat flours may be used in conjunction with wheat flours or alone if desired. Appropriate flours for use in the present invention include whole grain flours, flours with the bran and/or germ removed, bleached or unbleached, or combinations thereof. In the event that a non-wheat flour is used, addition of gluten may be desirable. Grains useful for the dough of the invention include wheat, oat, rye, sorghum, barley, rice, millet, and corn among others. The dough preferably comprises 45 to 60% flour based on total dough composition weight.

Water is a necessary ingredient in doughs of the present invention. Water is added to the dough as liquid water, ice, or it is added via hydrated ingredients. Ice is added to supply water to doughs in order to keep the combination cool during mixing. Water is present in the dough in the amount up to about 50 percent by weight, more preferably between about 25 and 45 percent by weight based on total dough composition weight.

For purposes of the present invention, a chemical leavening agent is a combination of chemical ingredients that react to produce carbon dioxide. Preferably, these chemical ingredients are a combination of an acid and a base that react to release carbon dioxide into the dough and thereby increase the volume of the dough. Suitable leavening acids are generally known in the industry and include but are not limited to citric acid, sodium acid pyrophosphate (SAPP), sodium aluminum phosphate (SALP), monocalcium phosphate (MCP), dicalcium phosphate (DCP), sodium aluminum sulfate (SAS), anhydrous monocalcium phosphate (AMCP), dimagnesium phosphate (DMP), dicalcium phosphate dihydrate (DCPD), gluconodelta lactone (GDL) and mixtures thereof. Suitable bases used in leavening agents generally include a carbonate and/or a bicarbonate salt. Suitable carbonate and bicarbonate salts include, for example, sodium carbonate, potassium carbonate, sodium bicarbonate (commonly known as baking soda), potassium bicarbonate, ammonium bicarbonate and mixtures thereof. An example of a preferred chemical leavening agent is the combination of sodium bicarbonate and glucono-delta-lactone. Typically, the leavening agent is provided as about 1% to about 6% by weight based on total dough composition weight.

Yeast may be used either alone or in conjunction with a chemical leavening agent to leaven the dough of the present invention. Yeast provides particular flavor and textural benefits, even when not acting as the primary leavening system for the dough product. Any suitable yeast and format thereof may be utilized, including baker's yeast, activated yeast, crumbled yeast, and so forth. When yeast is used as the sole or primary leavening agent in the dough of the present invention, time for proofing the dough may be required before cooking of the dough product to obtain the desired baked specific volume. The time required for proofing depends on the composition of the dough, and may be readily determined by the practitioner.

Fat, when provided as a component of the dough, improves the volume of the dough and enhances the mouthfeel, texture, and flavor of the baked product. Fats may be provided in the form of oil, or more preferably as shortening. Fat is preferably present in the dough composition as 0.1 to 40% fat, based on total dough composition weight. A shortening that is solid at room temperature (i.e. "plastic") is preferred in biscuit dough and is used in the range of 12% to 20% by weight of the dough. The plastic shortening could be emulsified or non-emulsified and have the form of a chip, pellet, flake or any variation thereof.

Protein is a preferred optional additional ingredient that may be added to provide structural and textural benefits in addition to frozen shelf-life extension and coloration. Protein may be used in a range between 1% and 10% by weight. Protein sources include dairy (e.g. milk and egg), wheat, high protein flour and any combination thereof.

Other ingredients may be added to the dough such as sweeteners, preservatives, flavorings, spices or browning agents and the like. The dough can also include a sweetener, which may be provided either as a natural or artificial sweetener or as a liquid or dry ingredient. Suitable sweeteners include but are not limited to lactose, sucrose, fructose, dextrose, maltose, corresponding sugar alcohols, corn syrup, malt, hydrogenated corn syrup, maltodextrin, and mixtures thereof. Such sweeteners may act either or both as flavoring agents, texturizing, or browning agents. Enrichment nutrients that may be added to the dough may include thiamine, riboflavin, niacin, iron, calcium, and mixtures thereof. Other ingredients that may optionally be added to the dough mixture include dough seasonings, extenders, and food colorings as desired.

Doughs of the present invention may optionally include additional flavoring agents. Such flavoring agents include but are not limited to such ingredients as salt, milk and milk products, eggs and egg products, cocoa, whey, malt, yeast, yeast extract, inactivated yeast, spices, herbs, and vanilla. The optional flavoring agent preferably comprises from above about 0.1 percent by weight, and more preferably from about 0.5 and about 5.0 percent by weight of the dough.

The dough can further include emulsifiers. Suitable emulsifiers include, for example, mono- and di-glycerides of fatty acids, propylene glycol mono- and di-esters of fatty acids, glycerol-lacto esters of fatty acids, ethoxylated mono-glycerides, lecithin, protein, and mixtures thereof. Preferred emulsifiers include mono-glycerides and mixtures of propylene glycol mono- and di-esters of fatty acids, mono-glycerides and lecithin. The dough may preferably comprise emulsifiers in an amount of from about 0.1 percent to about 2.5 percent by weight of the dough.

Hydrocolloids may be added as a separate component to the dough formulation in order to assist in building viscosity, binding water, and trapping gases, which include, for example, starches, gums (e.g. xanthan and guar), cellulose, and carageenan. Such compounds may be present as natural components of other ingredients of the dough formulation, for example in flour.

Preservatives may also be present in the dough of the present invention, and provide shelf-life extension for the baked product. Examples of preferred preservatives include, for example, potassium sorbate, sorbic acid, sodium propionate, and sodium diacetate. The dough may preferably comprise preservatives in an amount of from about 0.1 percent to about 2.5 percent by weight of the dough.

Preferably, the dough has a water activity of between about 0.92 and 0.97.

For illustrative purposes only, the following exemplary process of preparing a filling in accordance with the present invention is provided. Any dry components, e.g., sugar or the gelling agent, to be utilized in the filling can be mixed together. The fat is then added, and advantageously may be heated to a temperature at which the fat will flow to aid in mixing. If a liquid sweetener is to be included in the filling, it is desirably added next and also may be heated to aid in its incorporation into the filling. Any other flavors and/or additives desirably included in the filling may then be added along with other liquid ingredients and the filling mixed until uniform. If the filling has been heated by virtue of the inclusion of heated ingredients, the filling is desirably cooled to an appropriate temperature before being applied to a dough product. Alternatively, the filling may be stored in refrigerated conditions until it is desirably used.

Preferably, the filling is prepared in such manner to reduce the amount of air in the filling formulation. Thus, fewer air bubbles tend to provide fewer nucleation sites, in turn tending to reduce the tendency of the air to escape from the filling upon relief of pressure when the pressurized container is opened.

The dough product is prepared by mixing the dough composition as described above in conventional mixing equipment known in the baking arts, and segregating the dough into individual sized portions. The dough products may be made by a batch process, or continuous process, as will be appreciated by those of ordinary skill in the art.

The filling is incorporated in the dough composition by any appropriate steps required to construct the final dough product. For example, the dough composition may first be sheeted and cut into separate portions, a filling disposed thereon, and the dough composition folded over and optionally crimped to contain the filling therein.

Alternatively, the dough provided with portions of filling may be further provided with separate dough sheets, containing the filling portion in a laminar fashion. The separate portions are optionally treated, for example by spraying with water, to enhance the occasion of laminate portions of dough, thereby containing the filling within the dough. In yet another alternative, the dough may be provided in a portion, with filling injected in the middle of the dough portions by using a needle or other appropriate mechanism. In other constructions, the dough composition may be sheeted and having a filling applied thereto as a layer, and the dough/filling laminate rolled together and cut into separate portions to form a spiral shaped filled dough product. In yet another embodiment, the dough composition may be coextruded with the filling to provide a filling surrounded by a tubular form of dough composition. This coextruded construction may be cut into separate portions, and optionally crimped to contain the filling therein. Optionally, the surface of the filled dough product may be scored or otherwise provided with patterns to provide a unique expansion shape upon baking, or otherwise to provide an aesthetically pleasing final product. Other configurations of dough and filling will be readily appreciated by those of skill in this art. In one preferred embodiment of the present invention, the filling is partially enrobed in the dough. In other preferred embodiments of the present invention, the filling is fully enrobed in the dough.

In a preferred embodiment of the present invention, individual filled dough portions are provided having a total weight of from about 1 to about 8 oz in weight, and more preferably from about one to about three ounces in weight measured before baking. Preferably, the filling comprises from about one to about five ounces by weight of the product, and more preferably from about a quarter of an ounce to about two ounces by weight of the filled product.

The dough product is disposed within a container, such as a can or an air impermeable bag, in an unproofed state for refrigerated storage prior to baking. Examples of such containers are described in U.S. Pat. Nos. 3,981,433; 4,381,315; 4,415,598; 5,084,284; 6,042,852; and 5,759,596 the disclosures of which are incorporated herein by reference. More specifically, the dough product is placed in a container in an unproofed state, and the container is closed. As the chemical leavening system generates gas, the dough expands to fill the container. At a certain stage in the dough expansion process, the container is sealed and pressure builds as a result of continued gas generation from the chemical leavening system.

Once a dough product in accordance with the present invention has been prepared, it advantageously may be stored for a prolonged period of time, i.e., for up to 90 days or more at refrigerated temperatures or lower, without suffering a substantial degradation in the quality of the filling, dough or overall dough product. For purposes of the present invention, the term "refrigerated" describes dough products that are maintained at a temperature from about 32° F. to about 50° F. In particular, even though fillings of the present invention are very moist, no substantial moisture migration of any significance occurs between the filling and the dough product; there is no substantial color degradation of the filling; and there is little to no sogginess in the dough product that is filled. Importantly, structural integrity is also preserved, with very little or no filling leakage exhibited.

In use, the pressurized container is opened, and the filled dough product is placed on a suitable surface for baking. If the dough product is provided as segregated portions, these portions of dough are physically separated and placed on the baking surface. If necessary and/or desired, the filled dough product is allowed to proof prior to baking. Alternatively, the filled dough product may be immediately baked without a separate proofing step. The dough products are baked to provide a baked, filled dough product, preferably having a BSV of about 2.5 to about 6 cc/g.

The invention will further be described by reference to the following non-limiting examples. All percentages used herein are weight percentages, and are based on the total weight of the filling unless otherwise indicated.

EXAMPLES

Rheology of the filling composition is determined by measuring the components of viscosity and viscoelasticity, specifically G' and G". This can be measured using a variety of methods; one specific method uses oscillatory shear in parallel plates. A Rheometrics (of Piscataway, N.J.) DSR (dynamic stress rheometer) can be used, especially useful is an instrument adapted with heating plates to measure rheology at a variety of temperatures. The sample is loaded between the parallel plates and is compressed to a height of 2 mm. and shaped to a diameter of 40 mm. The frequency of the oscillations is set to 10 radians/second and the stress is set at 500 dynes/cm$^2$. The rate of temperature heating/cooling is set to 5° C./min. The sample is then heated and cooled while the oscillating plate measures its rheology.

Example 1

| Cheese filling | % |
| --- | --- |
| Uncolored cheese powder | 35.75 |
| Xanthan gum | 1.00 |
| Cheese flavor | 1.50 |
| Annato | 0.02 |
| Beta-Carotene | 0.005 |
| Vegetable shortening | 10.00 |
| Glycerol | 4.00 |
| Water | 46.975 |
| Hydroxypropyl Methylcellulose K4M | 0.75 |
| Total | 100 |

The filling formulation was prepared by dry blending the first three ingredients until uniformly dispersed. A third of the water was heated to 100° C. and then hydroxypropyl methylcellulose was added with stirring, until it dissolved, approximately 2 minutes. The remaining water was then added to this mixture and stirring was continued. Meanwhile, if solid fat was added, it was heated to its melting point to aid in dispersal. The annatto and beta-carotene was then added. The hydroxypropyl methylcellulose solution, the dry ingredients, the glycerol, and the fat mixture was then combined and mixed for one minute on low and one minute on high speed.

Example 2

| Cinnamon filling | % |
|---|---|
| Powdered sugar | 38.0 |
| Pregelatinized wheat starch | 6.0 |
| Cinnamon | 4.0 |
| Vegetable Oil | 15.5 |
| Water | 35.0 |
| Flavor | 0.5 |
| Hydroxypropyl Methylcellulose K4M | 1.0 |
| Total | 100 |

The filling formulation was prepared by dry blending the first three ingredients until uniformly dispersed. A third of the water was heated to 100° C. and then hydroxypropyl methylcellulose was added with stirring, until it dissolved, approximately 2 minutes. The remaining water was then added to this mixture and stirring was continued. The hydroxypropyl methylcellulose solution, the dry ingredients, the flavor, and the oil were then combined and mixed for one minute on low and one minute on high speed.

Example 3

| Gravy filling | % |
|---|---|
| Lactose | 15.3 |
| Pregelatinized wheat starch | 9.0 |
| Black pepper | 0.5 |
| Cayenne pepper | 0.2 |
| Onion powder | 1.0 |
| Salt | 1.5 |
| Beef concentrate | 5.0 |
| Water | 42.5 |
| Vegetable shortening | 21.0 |
| Glycerol | 3.0 |
| Hydroxypropyl Methylcellulose K4M | 1.0 |
| Total | 100 |

The filling formulation was prepared by dry blending the first six ingredients until uniformly dispersed. A third of the water was heated to 100° C. and then hydroxypropyl methylcellulose was added with stirring, until it dissolved, approximately 2 minutes. The remaining water was then added to this mixture and stirring was continued. Meanwhile, if solid fat was added, it was heated to its melting point to aid in dispersal. The hydroxypropyl methylcellulose solution, the dry ingredients, the glycerol, the beef concentrate, and the fat were then combined and mixed for one minute on low and one minute on high speed.

Example 4

| Cheese filling | % |
|---|---|
| Uncolored cheese powder | 35.0 |
| Colored cheese powder | 7.3 |
| Pregelatinized wheat starch | 5.0 |
| Vegetable shortening | 10.0 |
| Water | 40.7 |
| Cheese flavor | 1.0 |
| Hydroxypropyl Methylcellulose K4M | 1.0 |
| Total | 100 |

This filling formulation was prepared as described in Example 1.

Example 5

| Fruit filling | |
|---|---|
| Water | 47.36 |
| Sugar | 47.04 |
| Pregelatinized starch | 2.0 |
| Sodium alginate | 1.0 |
| Calcium Tartrate | 0.19 |
| Encapsulated fumeric acid | 2.0 |
| Fruit flavor | 0.4 |
| Color | 0.01 |
| Total | 100 |

This filling was prepared by dry blending the sugar, starch, alginate, calcium tartrate and fumeric acid, fruit flavor and color, and adding this slowly to the water in a blender, blending for 15 seconds. The resulting composition was poured into a mold.

Example 6

| Fruit filling | % |
|---|---|
| Water | 43.76 |
| Corn syrup | 24.77 |
| Sugar | 21.2 |
| Cook up starch | 7.0 |
| Gelatin | 2.0 |
| Citric acid | 1.0 |
| Potassium sorbate | 0.2 |
| Fruit flavor | 0.06 |
| Color | 0.01 |
| Total | 100 |

The filling formula was prepared by dissolving gelatin in 90° C. water, and keeping that slurry at 60° C. Concurrently, 20 grams of water, citric acid, color and flavor were combined in a separate container. A third slurry was made by softening corn syrup by applying low heat, adding starch and thoroughly blending, adding water and thoroughly blending, then bringing to a boil and boiling for 10 minutes. Sucrose was added to the boiling slurry and cooked for 4 minutes. The three slurrys were then blended and pour into molds.

Example 7

This example demonstrates the ability of certain filling formulations to be stable during storage and baking, to evaluate a range of moistures in the filling, and to evaluate fillings without added shortening.

|  | Comparative 0 starch % | 0 shortening % | 40.7% water % | 52% water % | 49% water % | 45% water % |
|---|---|---|---|---|---|---|
| uncolored cheese powder | 41.00 | 42.50 | 36.00 | 22.00 | 26.00 | 31.00 |
| colored cheese powder | 7.30 | 7.30 | 7.30 | 3.00 | 4.00 | 5.00 |
| pregel starch | 0.00 | 5.00 | 5.00 | 5.00 | 5.00 | 5.00 |
| shortening | 10.00 | 0.00 | 10.00 | 10.00 | 10.00 | 10.00 |
| glycerol |  |  |  | 7.00 | 5.00 | 3.00 |
| water | 40.70 | 44.20 | 40.70 | 52.00 | 49.00 | 45.00 |
| methocel | 1.00 | 1.00 | 1.00 | 1.00 | 1.00 | 1.00 |
| sum | 100 | 100 | 100 | 100 | 100 | 100 |
| water activity | 0.92 | 0.92 | 0.92 | 0.94 | 0.93 | 0.93 |
| G' Elastic modulus measured on fresh filling (Pa) |  |  |  |  |  |  |
| start ~25 C | 3805 | 18608 | 17210 | 4034 | 6534 | 9843 |
| hot ~80 C | 28 | 9169 | 3009 | 8058 | 3161 | 2106 |
| cooled ~25 C | 380 | 76104 | 35954 | 11237 | 12965 | 18534 |

The comparative formulation (containing no starch) was not can stable (Elastic modulus below ~4,000 Pa at 25 C), and showed unacceptable filling flow during baking. The formulation without added shortening had more strength (a higher elastic modulus) through all temperature conditions. A wide variety of high moisture fillings performed well through thirteen weeks of refrigerated storage.

All publications, patents and patent documents cited in this application are incorporated by reference herein, as though individually incorporated by reference. The invention has been described with reference to specific and preferred embodiments and techniques. However, other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A refrigerated, unbaked dough product comprising:
   a) a leavened dough;
   b) a high moisture non-emulsified filling at least partially enrobed in the leavened dough comprising
      i) water present as about 35% to about 60% by weight of the filling, and
      ii) gelling agent or thickening agent,
      iii) fat, when present, as no more than 15% by weight of the filling, said filling having a water moisture to fat content ratio when fat is present greater than or equal to 1.8, wherein the filling has an uncooked 20° C. G' value of at least about 4,000 pascals, and a 80° C. G' value of at least about 1000 Pa; and wherein the water activity of the filling is at least 0.85;
   said dough product being at a temperature from about 0° C. to about 10° C., and being disposed within a container at a pressure greater than one atmosphere.

2. The dough product of claim 1, wherein the filling has an uncooked 20° C. G' value of from about 4,000 to about 50,000 Pa.

3. The dough product of claim 1, wherein the filling has an 80° C. G' of from about 1000 to about 20,000 Pa.

4. The dough product of claim 1, wherein the filling has an 80° C. G' value of from about 1,500 to about 10,000 Pa.

5. The dough product of claim 1, wherein the filling comprises fat.

6. The dough product of claim 1, wherein the filling has an uncooked 20° C. G' value of from about 4,000 to about 50,000 Pa., and a 80° C. G' value of from about 1,000 to about 20,000 Pa.

7. The dough product of claim 6, wherein the filling has a cooked 25° C. G' value of less than about 1,000 Pa.

8. The dough product of claim 6, wherein the filling has a cooked 25° C. G' value of about 1,000 to about 50,000 Pa.

9. The dough product of claim 6, wherein the filling has a cooked 50° C. G' value of less than about 1,000 Pa.

10. The dough product of claim 6, wherein the filling has a cooked 50° C. G' value of about 1,000 to about 50,000 Pa.

11. The dough product of claim 1, wherein filling comprises a gelling agent that is heat stable.

12. The dough product of claim 11, wherein the heat stable gelling agent is xanthan gum.

13. The dough product of claim 1, wherein the filling comprises a gelling agent that is a heat-activated gelling agent.

14. The dough product of claim 13, wherein the heat-activated gelling agent is selected from methylcellulose and hydroxypropyl methylcellulose.

15. The dough product of claim 1, wherein the filling comprises a gelling agent that is a mixture of a thermodegradable gelling agent, and a thermo-reversible gelling agent.

16. The dough product of claim 15, wherein the thermodegradable gelling agent is a thermodegradable pregelatinized starch.

17. The dough product of claim 15, wherein the heat-activated gelling agent is selected from methylcellulose and hydroxypropyl methylcellulose.

18. The dough product of claim 1, wherein the difference between the water activity of the dough and the water activity of the filling is less than about 0.03.

19. The dough product of claim 1, wherein the filling is partially enrobed in the dough.

20. The dough product of claim 1, wherein the filling is fully enrobed in the dough.

21. The dough product of claim 1, wherein the dough product is selected from the group consisting of doughnuts, Danishes, toaster pastries, coffeecakes, sweet rolls, Bismarcks, cookies, bagels, scones, dinner rolls, sandwiches, breads, croissants, egg twists, and bread sticks.

22. The dough product of claim 1, wherein the dough product is a biscuit.

23. The dough product of claim 1, wherein the filling is a savory filling.

24. The dough product of claim 1, wherein the filling is a sweet filling.

25. The dough product of claim 1, wherein the filling comprises cheese.

26. The dough product of claim 1, wherein the container is a can.

\* \* \* \* \*

UNITED STATES PATENT AND TRADEMARK OFFICE
CERTIFICATE OF CORRECTION

PATENT NO.          : 8,591,975 B2                                      Page 1 of 1
APPLICATION NO.     : 10/369213
DATED               : November 26, 2013
INVENTOR(S)         : Enz et al.

It is certified that error appears in the above-identified patent and that said Letters Patent is hereby corrected as shown below:

On the Title Page, item 75 Inventors:

Jean Louis Weber, Plymouth, NH should be -- Jean Louise Weber, Plymouth, MN --

Signed and Sealed this
Fifteenth Day of April, 2014

Michelle K. Lee
*Deputy Director of the United States Patent and Trademark Office*